US008161011B2

(12) United States Patent
Bolik et al.

(10) Patent No.: US 8,161,011 B2
(45) Date of Patent: Apr. 17, 2012

(54) APPARATUS, SYSTEM, AND METHOD FOR ANALYZING A FILE SYSTEM

(75) Inventors: Christian Bolik, Oldenburg (DE); Carsten Brixius, Niedermoschel (DE); Gregory John Tevis, Tucson, AZ (US); David Gregory Van Hise, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 699 days.

(21) Appl. No.: 11/831,163

(22) Filed: Jul. 31, 2007

(65) Prior Publication Data

US 2009/0037479 A1    Feb. 5, 2009

(51) Int. Cl.
*G06F 7/00* (2006.01)
(52) U.S. Cl. .................... 707/668; 707/E17.01
(58) Field of Classification Search ....... 707/100–104.1, 707/200–204, 999.2, 668, E17.01
See application file for complete search history.

(56) References Cited

U.S. PATENT DOCUMENTS

| 5,485,606 A * | 1/1996 | Midgdey et al. ................. 707/10 |
| 6,396,904 B1 * | 5/2002 | Lilley et al. .................... 379/9.04 |
| 6,789,096 B2 * | 9/2004 | Sankaran et al. ............. 707/203 |
| 7,007,048 B1 | 2/2006 | Murray et al. ................. 707/204 |
| 7,225,211 B1 * | 5/2007 | Colgrove et al. ............. 707/205 |
| 2003/0046270 A1 * | 3/2003 | Leung et al. ......................... 707/1 |
| 2005/0033757 A1 * | 2/2005 | Greenblatt et al. ........... 707/100 |
| 2006/0004847 A1 | 1/2006 | Claudatos et al. ............ 707/103 |
| 2006/0004868 A1 | 1/2006 | Claudatos et al. ......... 707/104.1 |
| 2006/0010150 A1 * | 1/2006 | Shaath et al. .................. 707/102 |
| 2006/0059172 A1 * | 3/2006 | Devarakonda ................ 707/100 |
| 2006/0059206 A1 | 3/2006 | Ushijima et al. .............. 707/200 |
| 2006/0064555 A1 | 3/2006 | Prahlad et al. |
| 2006/0230044 A1 | 10/2006 | Utiger |
| 2006/0242125 A1 | 10/2006 | Tummins |

OTHER PUBLICATIONS

T.Tanaka et al., "Proposal and Evaluation of Policy Description for Information Lifecycle Management", Computational Intelligence for Modelling, Control and Automation, and International Conference on Intelligent Agents, Web Technologies and Internet Commerce, International Conference; vol. 1, pp. 261-267, Nov. 2005.

M. Themistocleous et al., "Extending the Information System Lifeforce Through Enterprise Application Integration: a case study experience", System Sciences, 2004. Proceedings of the 37th Annual Hawaii International Conference; Jan. 5-8, 2004.

Y. Chen, "Information Valuation for Information Lifecycle Management", Autonomic Computing, 2005. ICAC 2005. Proceeding Second International Conference; pp. 135-146, Jun. 13-16, 2005.

(Continued)

*Primary Examiner* — Tim T Vo
*Assistant Examiner* — Shiow-Jy Fan
(74) *Attorney, Agent, or Firm* — Kunzler Needham Massey & Thorpe

(57) ABSTRACT

An apparatus, system, and method are disclosed for analyzing a file system. A record module records file parameters comprising a file size, a file age, a time of last access, a file type, a recovery time objective, and an initial access time service level objective for each file in the file system. A file score module calculates a file score for each file using the file parameters. A system score module calculates the file system score as the sum of the normalized file scores. A process module processes the file system if the file system score exceeds a specified threshold.

18 Claims, 6 Drawing Sheets

OTHER PUBLICATIONS

Yi Zhang, et al., "Policy Lifecycle modle for systems management", IT Professional, vol. 7, Issue 2, pp. 50-54, Mar.-Apr. 2005.
G. Thickins, "Compliance: Do No Evil", Bye and Switch Insider, vol. 2, No. 5, May 2004.
F. Golshani, "Multimedia information lifecycle management", Multimedia, IEEE; vol. 11, Issue 2, Apr.-Jun. 2004.
D. Reiner et al., "Information lifecycle management: the EMC perspective", Data Engineering, 2004. Proceeding. 20th International Conference, pp. 804-807, Mar. 30, 2004-Apr. 2, 2004.
M. Beigi et al., Policy-Based Information Lifecycle Management in a Large-Scale File System, Proceedings of the Sixth IEEE International Workshop on Policies for Distrubuted Systems and Networks, 2005.

* cited by examiner

| File Size 310a | File Age 315a | Last Access 320a | Type 322a | RTO 325a | IAT 330a | File Score 335a |
| --- | --- | --- | --- | --- | --- | --- |
| File Size 310b | File Age 315b | Last Access 320b | Type 322b | RTO 325b | IAT 330b | File Score 335b |
| File Size 310c | File Age 315c | Last Access 320c | Type 322c | RTO 325c | IAT 330c | File Score 335c |
| File Size 310d | File Age 315d | Last Access 320d | Type 322d | RTO 325d | IAT 330d | File Score 335d |

FIG. 3

APPARATUS, SYSTEM, AND METHOD FOR ANALYZING A FILE SYSTEM

BACKGROUND OF THE INVENTION

1. Field of the Invention

This invention relates to file systems and more particularly relates to analyzing a file system.

2. Description of the Related Art

Data processing systems often include a significant number of servers, mainframe computers, computer workstations, storage devices, and the like. As a result, a data processing system may store a large quantity of data.

The data of a data processing system may be organized in one or more file systems. File systems may contain a plurality of files. The files may be created and/or modified at different times, and have different intrinsic values to an organization.

The cost of storing, archiving, and communicating the data of a data processing system can be reduced if the data is effectively managed. For example, a data processing system may implement one or more information lifecycle management processes to manage data from creation and modification through archiving and deletion.

Files that satisfy a lifecycle management protocol may be processed to more efficiently store the files. For example, a file that satisfies an archival protocol may be migrated to a hierarchical storage management system. The hierarchical storage management system may store the file in one or more storage pools. Each pool may have a distinct latency and cost, so that files that are likely to be accessed may be stored in low-latency, high-cost storage pools while files that are unlikely to be accessed may be stored in high-latency, low-cost storage pools.

Tools may be used for determining whether to process a file. For example, a management tool may look at a last update date of a file to determine whether to migrate the file to a hierarchical storage management system. Unfortunately, it is often advantageous to determine if a file system should be processed, a task for which management tools are not suited.

SUMMARY OF THE INVENTION

From the foregoing discussion, there is a need for an apparatus, system, and method that analyze a file system. Beneficially, such an apparatus, system, and method would determine if the file system should be processed.

The present invention has been developed in response to the present state of the art, and in particular, in response to the problems and needs in the art that have not yet been fully solved by currently available analysis methods. Accordingly, the present invention has been developed to provide an apparatus, system, and method for analyzing a file system that overcome many or all of the above-discussed shortcomings in the art.

The apparatus to analyze a file system is provided with a plurality of modules configured to functionally execute the steps of recording file parameters, calculating a file score for each file, calculating a file system score as the sum of the normalized file scores, and processing the file system if the file system score exceeds a specific threshold. These modules in the described embodiments include a record module, a file score module, a system score module, and a process module.

Each module includes a computer readable program, which is executed on a processor. The record module is configured to record file parameters comprising a file size, a file age, a time of last access, a file type, a recovery time objective, and an initial access time service level objective for each file in the file system.

The file score module is configured to calculate a file score for each file using the file parameters. The system score module is configured to calculate a file system score as the sum of the normalized file scores and the process module is configured to process the file system if the file system score exceeds a specified threshold.

In one embodiment the process module processes the file system by archiving specified files. The file score module may calculate each file score using the equation $s_f = k_1 f + k_2 a + k_3 t + k_4 y + k_5 r + k_6 l$ where each k is a specified weight, f is the file size, a is the file age, t is the time of last access, y is the file type, r is the recovery time objective, and l is the initial access time service level objective In another embodiment the file score module may be configured to add a product of a migration applicability score, a migration applicability weight, storage tier cost score and a storage tier cost weight to each file score $s_f$. In an alternate embodiment the file score module may be configured to add a product of average storage cost and potential space savings, if all files having a file score greater than zero were migrated or deleted, to the file system score. The disclosed apparatus uses a combination of multiple file characteristics to calculate a file system's value to the business and execute management actions based on these reports, as determined by enterprise-wide policies.

A system of the present invention is also presented to analyze a file system. The system includes a plurality of servers, a network in communication with the servers, a hierarchical storage management server in communication with the network and a processor. The hierarchical storage management server includes a record module, a file score module, a system score module and a process module.

The file score module is configured to calculate a file score for each file using the file parameters. The system score module is configured to calculate a file system score as the sum of the normalized file scores and the process module is configured to process the file system if the file system score exceeds a specified threshold.

In one embodiment the process module processes the file system by archiving specified files. The file score module may calculate each file score using the equation $s_f = k_1 f + k_2 a + k_3 t + k_4 y + k_5 r + k_6 l$ where each k is a specified weight, f is the file size, a is the file age, t is the time of last access, y is the file type, r is the recovery time objective, and l is the initial access time service level objective A method of the present invention is also presented for analyzing a file system. The method in the disclosed embodiments substantially includes the steps to carry out the functions presented above with respect to the operation of the described apparatus and system. The method includes recording file parameters, calculating a file score for each file, calculating a file system score as the sum of the normalized file scores, and processing the file system if the file system score exceeds a specific threshold.

A record module records file parameters comprising a file size, a file age, a time of last access, a file type, a recovery time objective, and an initial access time service level objective for each file in a file system. A file score module calculates a file score for each file using the file parameters. A system score module calculates a file system score as the sum of the normalized file scores. A process module processes the file system if the file system score exceeds a specified threshold.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention analyzes a file system to determine where to process the file system. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a schematic block diagram illustrating one embodiment of file parameters of the present invention;

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
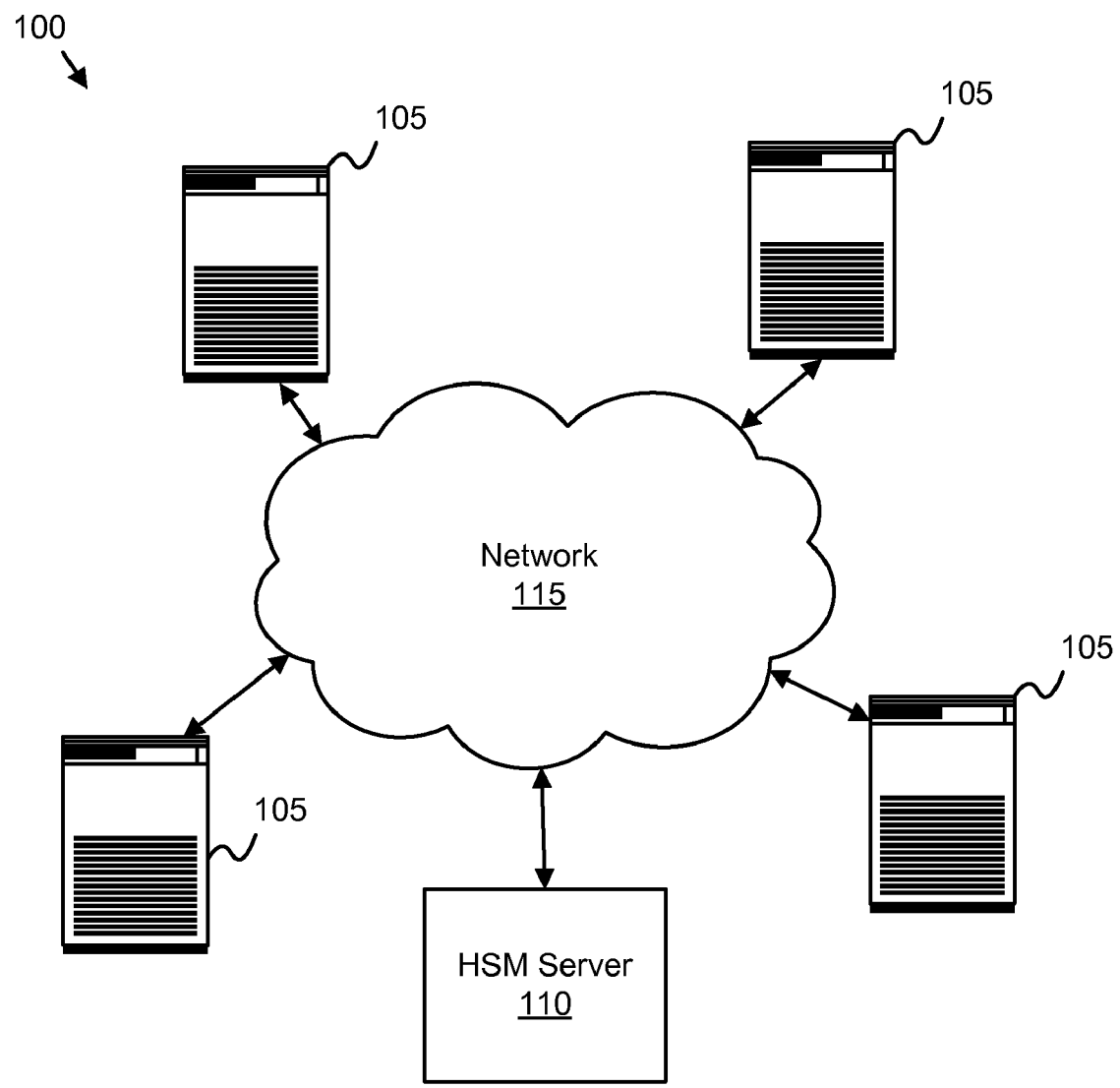
FIG. 1 is a schematic block diagram illustrating one embodiment of a data processing system in accordance with the present invention.

FIG. 1 is a schematic block diagram illustrating one embodiment of a data processing system 100 in accordance with the present invention. The data processing system 100 includes one or more client computers 105, a network 115, and a hierarchical storage management (HSM) server 110. As used herein, the client computers 105 are referred to as clients 105. One of skill in the art will also readily recognize that the DPS 100 could include other data processing devices such as bridges, scanners, printers, and the like.

As is well known to one skilled in the art, the HSM server 110 provides a policy-based management of file backup and archiving in a HSM that uses storage devices economically and without a user needing to be aware of when files are being retrieved from backup storage media. Although the HSM may be implemented on a standalone system, it is more frequently used in the distributed network of an enterprise. The hierarchy represents different types of storage media, such as redundant array of independent disk systems, optical storage, and/or tape, each type representing a different level of cost and speed of retrieval when access is needed. For example, as a file ages in an archive, the file can be automatically moved to a slower but less expensive form of storage.

HSM server 110 adds to archiving and file protection for disaster recovery the capability to manage storage devices efficiently, especially in large-scale user environments where storage costs can mount rapidly. The HSM server 110 also enables the automation of backup, archiving, and migration to the hierarchy of storage devices in a way that frees users from having to be aware of the storage policies. Older files may be automatically moved to less expensive storage. If needed, the older files appear to be immediately accessible and can be restored transparently from the backup storage medium.

The HSM server 110 may also be configured as a Storage Resource Management (SRM) server and may be mainframe computers, blade centers comprising multiple blade servers, and the like. As may be known to one skilled in the art, SRM is the process of optimizing the efficiency and speed with which the available drive space is utilized in a storage area network (SAN).

Figure 2:
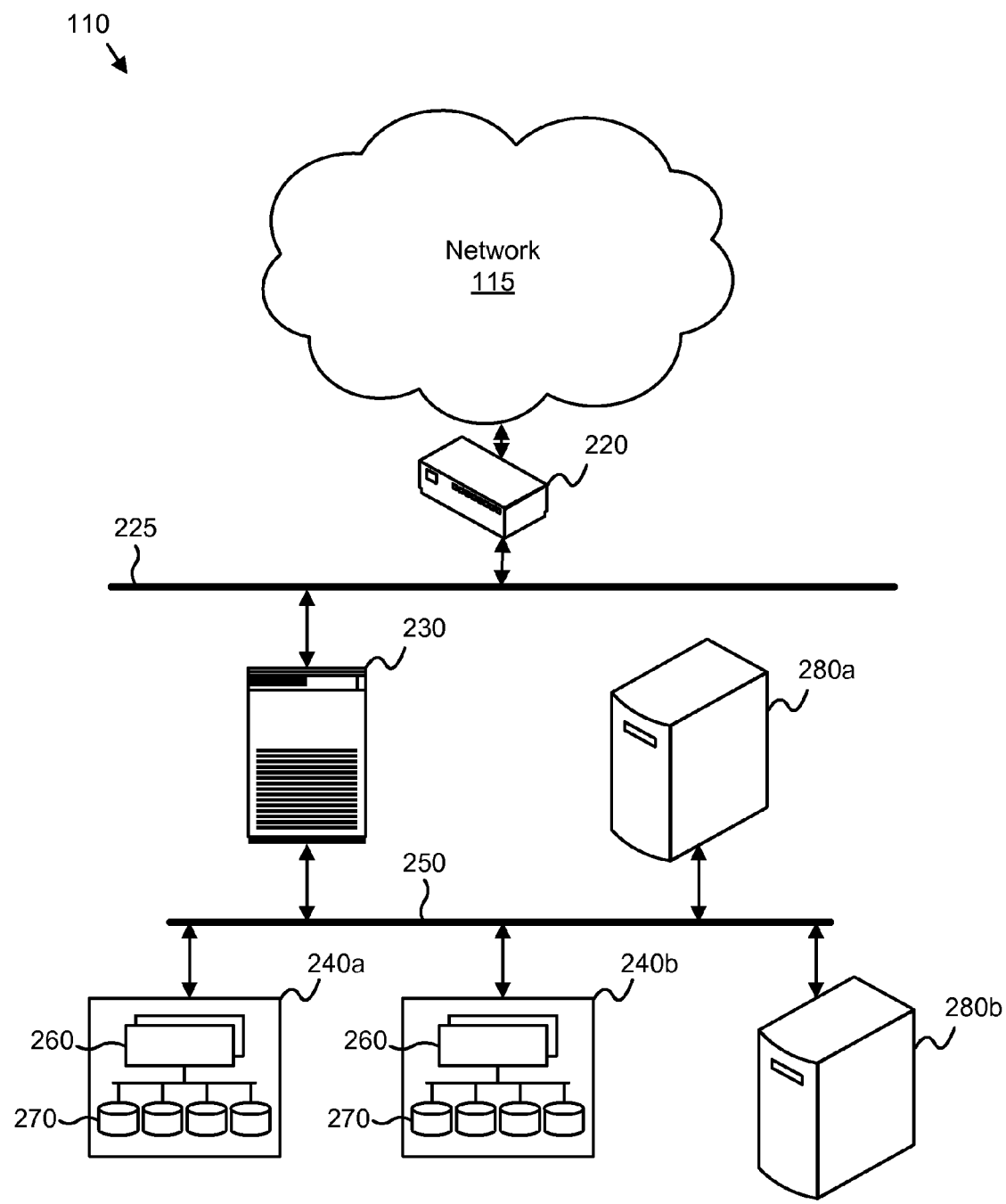
FIG. 2 is a schematic block diagram illustrating one embodiment of a HSM server of the present invention.

FIG. 2 is a schematic block diagram illustrating one embodiment of the HSM server 110. The HSM server 110 includes a network 115, a router 220, an internal network 225, a server 230, a storage communications channel 250, one or more storage subsystems 240, and one or more tape drives 280. The description of the HSM server 110 refers to elements of FIG. 1, like numbers referring to like elements.

Each storage subsystem 240 includes one or more storage controllers 260 and one or more storage devices 270. The storage devices 270 may be hard disk drives, optical storage devices, micromechanical storage devices, holographic storage devices, and semiconductor storage devices.

In one embodiment, the HSM server 110 provides data storage and management services for the servers 105. For example, the HSM server 110 may back up files from a server 105 to a storage subsystem 240. In addition, the HSM server 110 may later migrate the files from the storage subsystem 240 to a magnetic tape on a tape drive 280.

The HSM server 110 may use agents deployed on the various application servers and workstations in the enterprise to collect information on files and file systems on the servers 105, which may be stored in the storage subsystem 240. Alternatively, the information may be stored in direct attached storage, network attached storage, and/or a storage area network (SAN). In one embodiment, the HSM server 110 accesses the servers 105 by making use of remote access protocols.

FIG. 3 is a schematic block diagram illustrating one embodiment of file parameters 300 of the present invention. The file parameters 300 are configured to record file parameters comprising a file size 310a-d, a file age 315a-d, a time of last access 320a-d, a file type 322a-d, a recovery time objective 325a-d, and an initial access time service level objective 330a-d for each file in a file system such as a file system of a server 105. Using the above parameters, a file score that may be a lifecycle management metric score 335a-d is calculated.

File parameters 300 such as the file size 310a-d, file age 315a-d, time of last access 320a-d, and file type 322a-d may record a size in bytes, a time interval since last modification, a time interval since a last read respectively, and a type as is well known to one skilled in the art. The recovery time objectives 325a-d may be a specified time interval in which an administrator requires backup files to be recovered.

The recovery time objective 325a-d may be a function of the extent to which an interruption disrupts normal operations and an amount of revenue lost per unit time as a result of the interruption. These factors in turn depend on the affected files. The recovery time objective 325a-d may be measured in seconds, minutes, hours, and/or days, For example, the more migrated data in a file system, the more time required to restore that file system to a state where it can be accessed by users and applications, deferring a time when the data can actually be accessed. The initial access time 330a-d may specify a time interval during which a file system must be accessed. Files requiring very short initial access time 330a-d should be treated as being less suitable candidates for HSM migration to avoid breaching this particular initial access time service level objective 330 when the files first need to be recalled from backend HSM storage to be accessible.

As a prerequisite for Information Lifecycle Management (ILM), which manages data from inception to disposal as required by the data's value to the business, organizations need to get an understanding of the data present in their infrastructure. In order to be able to assign value and policies to the data, the aforementioned criteria need to be taken into account.

Figure 4:
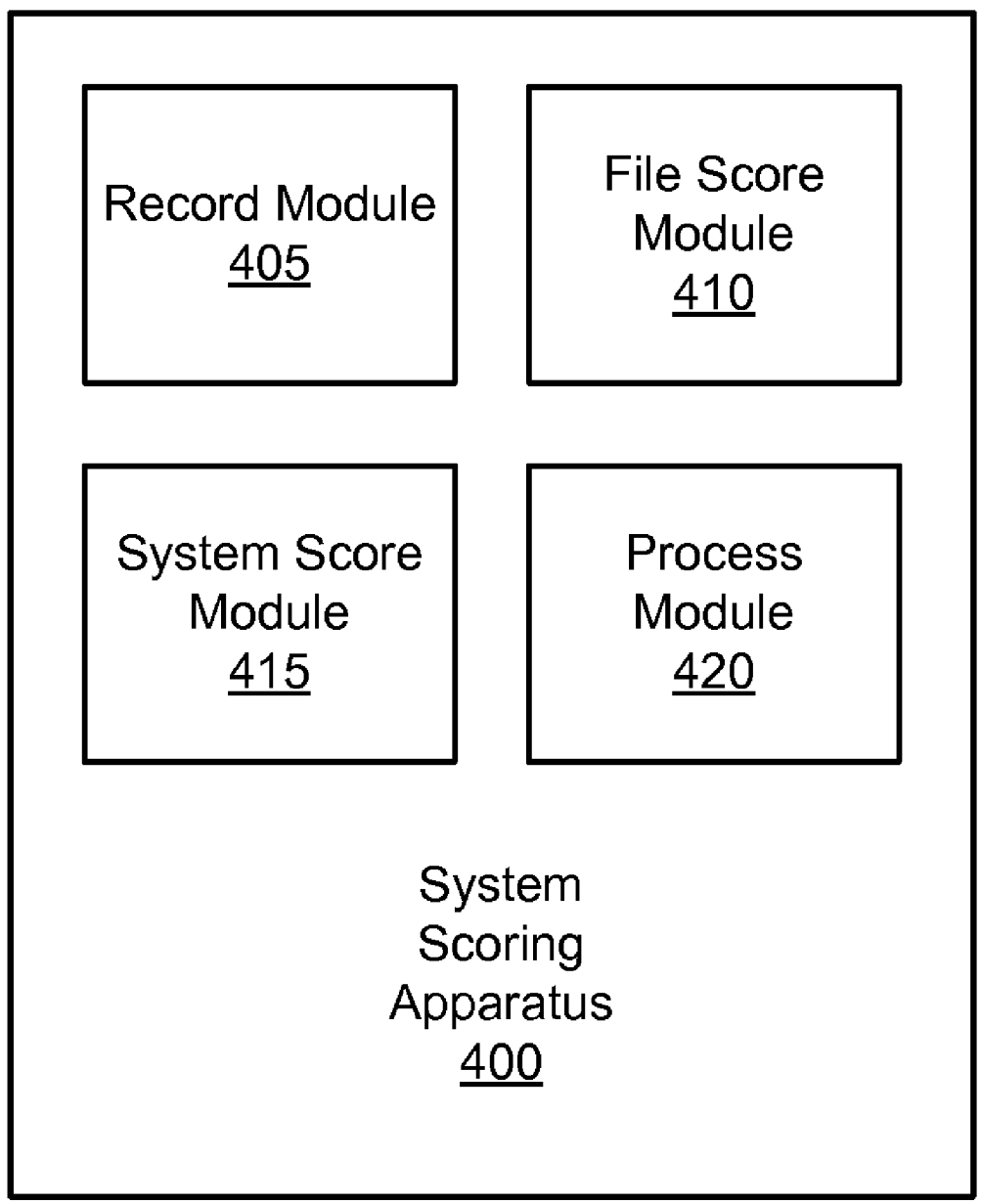
FIG. 4 is a schematic block diagram illustrating one embodiment of a system scoring apparatus of the present invention.

FIG. 4 is a schematic block diagram illustrating one embodiment of a system scoring apparatus 400 of the present invention. The apparatus 400 includes a record module 405, a file score module 410, a system score module 415, and a process module 420. The apparatus 400 may be embodied in the server 230 of FIG. 2. The description of the apparatus 400 refers to elements of FIGS. 1-3, like numbers referring to like elements.

Each module includes a computer readable program, which is executed on a processor such as a processor of the server 230. The record module 405 is configured to record file parameters comprising a file size 310a-d, a file age 315a-d, a time of last access 320a-d, a file type, a recovery time objective 325a-d, and an initial access time service level objective 330a-d for each file in the file system.

The file score module 410 is configured to calculate a file score for each file using the file parameters as will be described hereafter. The system score module 415 is configured to calculate a file system score as the sum of the normalized file scores. The process module 420 is configured to process the file system if the file system score exceeds a specified threshold.

In one embodiment the process module 420 processes the file system by archiving specified files. The file score module 410 may calculate each file score $s_f$ using Equation 1, where each k is a specified non-zero weight, f is the file size 310, a is the file age 315, t is the time of last access 320, y is the file type, r is the recovery time objective 325, and l is the initial access time service level objective 330.

$$s_f = k_1 f + k_2 a + k_3 t + k_4 y + k_5 r + k_6 l \qquad \text{Equation 1}$$

The file score module 410 analyzes individual files to determine the files' HSM candidacy. The system score module 415 accumulates and normalizes these file level evaluations to determine a system file core for entire file systems. This gives storage administrators and information lifecycle managers a convenient indication of the value that might be obtained from implementing HSM on given file systems.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
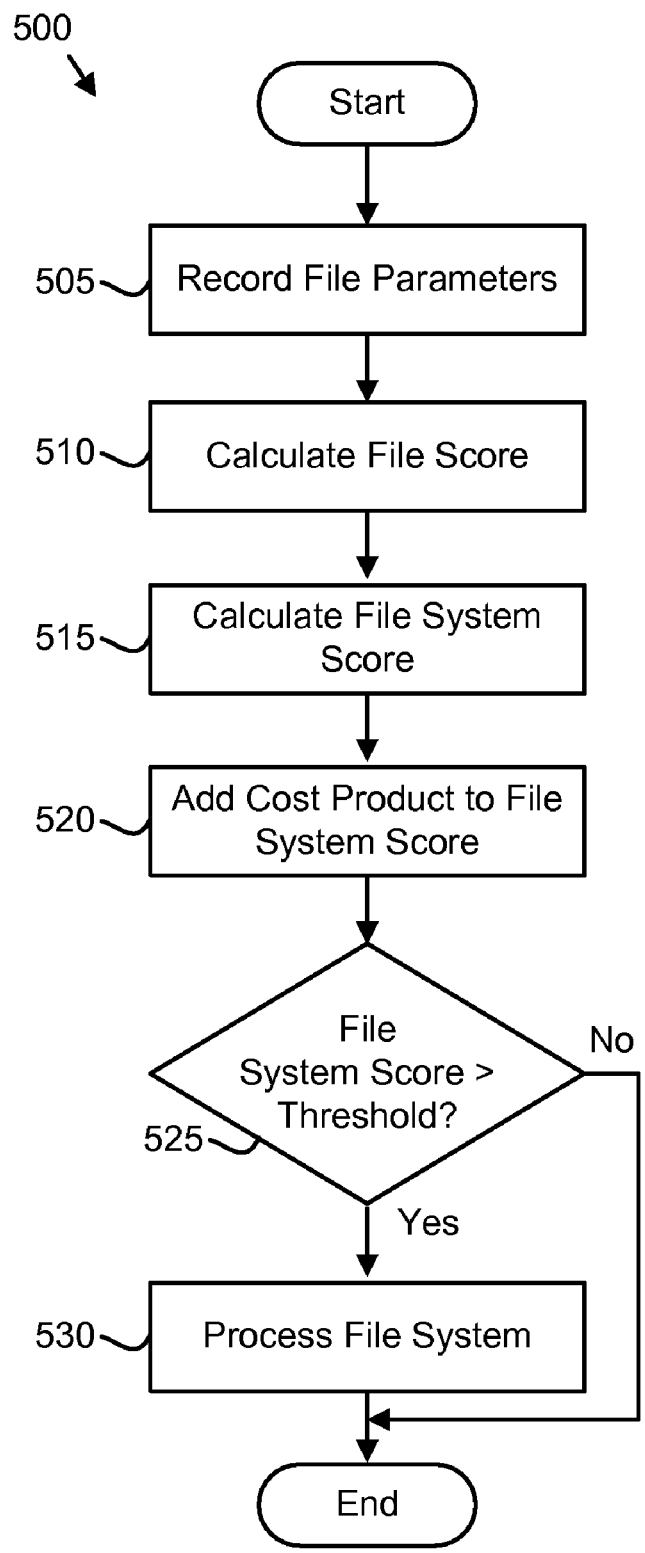
FIG. 5 is a schematic flow chart diagram illustrating one embodiment of a file system analyzing method of the present invention.

FIG. 5 is a schematic flow chart diagram illustrating one embodiment of a file system analyzing method 500 of the present invention. The method 500 substantially includes the steps to carry out the functions presented above with respect to the operation of the described apparatus and system of FIGS. 1-4. In one embodiment, the method 500 is implemented with a computer program product comprising a computer readable medium having a computer readable program. The computer readable program may be integrated into a computing system such as the server 230 wherein the program in combination with the computing system is capable of performing the file analyzing method 500. The description of the method 500 refers to elements of FIG. 1-4, like numbers referring to like elements.

The method 500 begins and the record module 405 records 505 file parameters 300 comprising the file size 310, the file age 315, the time of last access 320, the file type, the recovery time objective 325, and the initial access time service level objective 330 for each file in a file system. The file score module 410 calculates 510 a file score $s_j$ 335 for each file using the file parameters as shown in Equation 1.

The system score module 415 calculates 515 a file system score as the sum of the normalized file scores. In one embodiment, the system score module 415 calculates the file system score $s_s$ using Equation 2, where n is the number of files and $s_j$ is the file score for a jth file as calculated using Equation 1.

$$s_s = \sum_{j=1}^{n} s_j \qquad \text{Equation 2}$$

In one embodiment, the system score module 415 may be configured to add 520 a product of average storage cost $c_j$ and potential space savings $q_j$ to the file system score $s_s$ as shown in Equation 3 if all files having a file score greater than zero were migrated or deleted.

$$s_s = s_s + (c_j \times q_j) \qquad \text{Equation 3}$$

The process module 420 verifies 525 if the file system score $s_s$ exceeds a specified threshold. If the file system score exceeds the specified threshold, the process module 420 processes 530 the file system and the method 500 terminates. For example, the process module 420 may migrate the file system to the HSM server 110. In an alternate embodiment, the process module 420 may process 530 the file by backing up the file system.

Once the system score module 415 calculates 515 a file system score as the sum of the normalized file scores, the score of all files in a file system may be summed to calculate both total and average score of the file system. This allows the comparison of multiple file systems across multiple computers, e.g. to determine which file systems are most suitable for being placed under HSM management, where files may be automatically migrated to lower cost storage. If the file system score does not exceed the specified threshold, the method 500 terminates.

In one embodiment the process used to calculate the value of the individual files calculates a score of each file, which is the inverse of its value. For instance the higher the score, the less valuable is the file to the business and the more suitable it is to migration to lower cost storage, archival or even deletion. The score of all files in a file system is summed up to calculate both total and average score of the file system.

The file system score allows the comparison of multiple file systems across multiple computers, e.g. to determine which file systems are most suitable for processing such as being placed under HSM management. In parallel, the total size of all files with a score greater than a predefined value is calculated, e.g. to enable calculation of the potential space saving if all of these files were migrated or removed from the file system.

Figure 6:
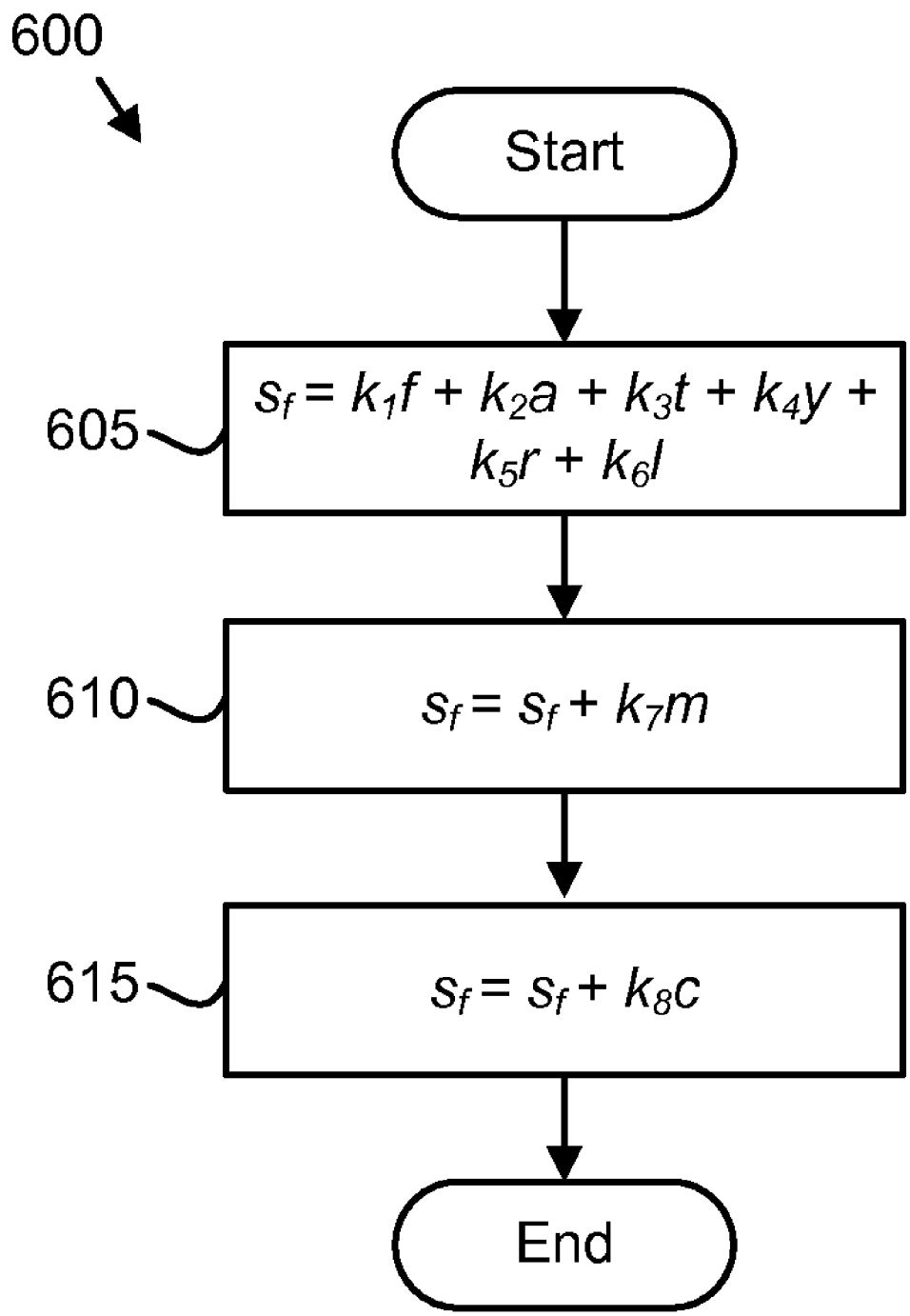
FIG. 6 is a schematic flow chart diagram illustrating another embodiment of a file system calculation method of the present invention.

FIG. 6 is a schematic flow chart diagram illustrating another embodiment of a file score calculation method 600 of the present invention. The method 600 may embody step 510 of FIG. 5. The description of the method 600 refers to elements of FIGS. 1-5, like numbers referring to like elements.

The file system calculation method 600 begins and the file score module 410 calculates 605 each file score using the Equation 1. In one embodiment the file score module 410 may be configured to add 610 a product of a migration applicability score and a migration applicability weight to each file score $s_f$, as shown in Equation 4, where $k_7$ is the migration applicability weight and m is migration score.

$$s_f = s_f + k_7 m \qquad \text{Equation 4}$$

The file score module 410 may be configured to add 615 a product of a storage tier cost score and a storage tier cost weight to the file score as shown in Equation 5, where $k_8$ is the storage tier cost weight and c is the storage tier cost score, and the method 600 terminates.

$$s_f = s_f + k_8 c \qquad \text{Equation 5}$$

The present invention analyzes file system storage on servers 105 across the enterprise and may enforce policies across all these servers 105. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to analyze a file system, the apparatus comprising:
    a tangible memory storing a computer readable program;
    a processor executing the computer readable program, the computer readable program comprising
        a record module recording file parameters comprising a file size, a file age, a time of last access, a file type, a recovery time objective, and an initial access time service level objective for each file in the file system;
        a file score module calculating a file score for each file as a sum of products of each of the file parameters multiplied by a specified non-zero weight for the file parameter;
        a system score module calculating a file system score as a sum of normalized file scores for each file in the file system, the file system score indicating a suitability of the file system for processing; and
        a process module processing the file system if the file system score exceeds a specified threshold.

2. The apparatus of claim 1, wherein the process module processes the file system by archiving specified files.

3. The apparatus of claim 1, wherein the file score module calculates each file score using the equation $s_f = k_1 f + k_2 a + k_3 t + k_4 y + k_5 r + k_6 l$ where each k is the specified non-zero weight for the corresponding file parameter, f is the file size, a is the file age, t is the time of last access, y is the file type, r is the recovery time objective, and l is the initial access time service level objective.

4. The apparatus of claim 3, the file score module further adding a product of a migration applicability score and a migration applicability weight to each file score $s_f$, each file score $s_f$ further comprising a product of a storage tier cost score and a storage tier cost weight.

5. The apparatus of claim 1, the file score module further adding a product of average storage cost and potential space savings, if all files having a file score greater than zero were migrated or deleted, to the file system score.

6. A computer program product comprising a tangible computer readable medium having a computer readable program, wherein the computer readable program when executed on a computer causes the computer to:
record file parameters comprising a file size, a file age, a time of last access, a file type, a recovery time objective, and an initial access time service level objective for each file in a file system;
calculate a file score for each file as a sum of products of each of the file parameters multiplied by a specified non-zero weight for the file parameter;
calculate a file system score as a sum of normalized file scores for each file in the file system, the file system score indicating a suitability of the file system for processing; and
process the file system if the file system score exceeds a specified threshold.

7. The computer program product of claim 6, the computer readable program further causing the computer to process the file system by placing the file system under a hierarchical storage management system management.

8. The computer program product of claim 6, the computer readable program further causing the computer to process the file system by archiving specified files.

9. The computer program product of claim 6, the computer readable program further causing the computer to calculate each file score using the equation $s_f=k_1f+k_2a+k_3t+k_4y+k_5r+k_6l$ where each k is the specified non-zero weight for the corresponding file parameter, f is the file size, a is the file age, t is the time of last access, y is the file type, r is the recovery time objective, and l is the initial access time service level objective.

10. The computer program product of claim 9, the computer readable program further causing the computer to add a product of a migration applicability score and a migration applicability weight to each file score $s_f$, each file score $s_f$ further comprising a product of a storage tier cost score and a storage tier cost weight.

11. The computer program product of claim 10, the computer readable program further causing the computer to add a product of average storage cost and potential space savings, if all files having a file score greater than zero were migrated or deleted, to the file system score.

12. The computer program product of claim 11, wherein the potential space savings per file system is calculated as the sum of the file size of each file with a file score of greater than zero.

13. The computer program product of claim 12, wherein the potential cost savings per file system is calculated as the product of potential space savings and average cost of all storage tiers associated with the file system.

14. A system to analyze a file system, the system comprising:
a plurality of servers;
a network in communication with the servers;
a hierarchical storage management server in communication with the network and comprising a processor, the hierarchical storage management server further comprising a tangible memory storing a computer readable program and a processor executing the computer readable program, the computer readable program comprising
a record module recording file parameters comprising a file size, a file age, a time of last access, a file type, a recovery time objective, and an initial access time service level objective for each file in the file system;
a file score module calculating a file score for each file as a sum of products of each of the file parameters multiplied by a specified non-zero weight for the file parameter;
a system score module calculating a file system score as a sum of normalized file scores for each file in the file system, the file system score indicating a suitability of the file system for processing; and
a process module archiving the file system if the file system score exceeds a specified threshold.

15. The system of claim 14, wherein the file score module calculates each file score using the equation $s_f=k_1f+k_2a+k_3t+k_4y+k_5r+k_6l$ where each k is the specified non-zero weight for the corresponding file parameter, f is the file size, a is the file age, t is the time of last access, y is the file type, r is the recovery time objective, and l is the initial access time service level objective.

16. The system of claim 15, the file score module further adding a product of a migration applicability score and a migration applicability weight to each file score $s_f$, each file score $s_f$ further comprising a product of a storage tier cost score and a storage tier cost weight.

17. A method for deploying computer infrastructure, comprising integrating a computer readable program stored on a tangible memory device into a computing system, wherein the program in combination with the computing system performs the following:
recording file parameters comprising a file size, a file age, a time of last access, a file type, a recovery time objective, and an initial access time service level objective for each file in a file system;
calculating a file score for each file as a sum of products of each of the file parameters multiplied by a specified non-zero weight for the file parameter;
calculating a file system score as the sum of normalized file scores for each file in the file system, the file system score indicating a suitability of the file system for processing; and
archiving the file system if the file system score exceeds a specified threshold.

18. The method of claim 17, wherein each file score is calculated using the equation $s_f=k_1f+k_2a+k_3t+k_4y+k_5r+k_6l$ where each k is the specified non-zero weight for the corresponding file parameter, f is the file size, a is the file age, t is the time of last access, y is the file type, r is the recovery time objective, and l is the initial access time service level objective.

* * * * *